United States Patent [19]

Kawane

[11] Patent Number: 4,632,405
[45] Date of Patent: Dec. 30, 1986

[54] DEVICE FOR FORCING PISTON RING RADIALLY OUTWARDLY

[75] Inventor: Minoru Kawane, Ichikawa, Japan

[73] Assignee: Ishikawajima-Harima Jukogyo Kabushiki Kaisha, Japan

[21] Appl. No.: 849,952

[22] Filed: Apr. 9, 1986

[30] Foreign Application Priority Data

Apr. 15, 1985 [JP] Japan .............................. 60-54727[U]
Apr. 15, 1985 [JP] Japan .............................. 60-54728[U]

[51] Int. Cl.[1] ................................................ F16J 9/06
[52] U.S. Cl. ..................................... 277/150; 277/151
[58] Field of Search ................ 277/138, 139, 149–151, 277/164

[56] References Cited

U.S. PATENT DOCUMENTS

| 350,004 | 9/1886 | Lang | 277/150 |
| 1,031,744 | 7/1912 | Thompson | 277/150 |
| 1,427,425 | 8/1922 | Sullivan | 277/150 |
| 1,529,041 | 3/1925 | Sullivan | 277/150 X |

Primary Examiner—Robert S. Ward

[57] ABSTRACT

A device for forcing a piston ring, which is a sealing member interposed between the cylindrical outer surface of a piston and the bore wall of a cylinder, radially outwardly beyond the cylindrical outer surface of the piston. A plunger rod which forces the piston ring radially outwardly is extended through a coiled spring. One end of the coiled spring is enlarged in diameter and is made into engagement with the edge surface of a radial hole into which is inserted the coiled spring while the other end of the coiled spring is made into engagement with the inner end of the plunger rod, whereby the piston ring is forced to extend radially outwardly by the compressive force of the coiled spring acting on the piston ring through a plunger.

4 Claims, 3 Drawing Figures

DEVICE FOR FORCING PISTON RING RADIALLY OUTWARDLY

BACKGROUND OF THE INVENTION

The present invention relates to a device for forcing a piston ring radially outwardly and more particularly a device for forcing a piston ring radially outwardly adapted for use in a reciprocating compressor or with a piston valve which reciprocates in a cylinder under a gas pressure or an air cylinder driving valve.

Generally, an oilless reciprocating compressor has a piston ring for compressing a gas. The piston ring is forced against the bore wall of a cylinder so as to minimize the leakage of the gas being compressed. Various methods have been devised and demonstrated for forcing a piston ring against the bore wall of a cylinder; one of them uses a plunger as shown in FIG. 3.

In FIG. 3, reference numeral 21 designates a cylinder; 22, a piston; 23, a circumferential groove of the piston 22; 24, a piston ring loosely fitted into the groove 23; 25, a radial hole of the piston ring 25; 26, a sleeve made from Teflon (trademark) and securely fitted into the hole 25; 27, a plunger rod in the form of a hollow cylinder and loosely fitted into the sleeve 26; 28, a plunger securely attached to the radially outward end of the plunger rod 27 and adapted to force the piston ring to the bore wall of the cylinder 21; 29, a coiled spring disposed in compressed state within the plunger rod 27; 30, a guide pin for the coiled spring 29; and 31, spring shoes or cushions.

In the device as shown in FIG. 3, the compressed spring 29 always forces the plunger to move in the radially outward direction (right in FIG. 3) so that the piston ring 24 is always made into intimate contact with the bore wall of the cylinder 21.

When the piston ring 24 is new and is not worn out, the coiled spring 29 is bent because of large deflection or compression received and is made into contact with the inner wall of the plunger rod 27. As the compression and suction cycles are repeated, the plunger 28 is caused to slightly vibrate in the direction in which the coiled spring 29 pushes the plunger 28 so that friction is produced between the coiled spring 29 and the inner wall of the plunger rod 27, resulting in wear or damage of the former and/or the latter. This causes lack of force for forcing the piston ring 24 to the bore wall of the cylinder 21 and consequently the piston ring 24 or the piston 22 itself is damaged.

When the spring shoes 31 at the ends of the coiled spring are inclined or deformed, the coiled spring 29 is bent so that the above-described problem also arises.

If the piston ring 24, which is always forced into intimate contact with the bore wall of the cylinder 21, is made of a material which tends to be broken (for instance, carbon) and if a portion of the piston ring 24 against which is forced the plunger 28 is lost because of wear or damage, the plunger 28 is forced to move out of the groove 23 and in some cases the plunger rod 27 as well as the coiled spring 25 are also moved out of the hole 25. As a result, the plunger 28 is forced into direct contact with the bore wall of the cylinder 21 and is reciprocated in unison with the piston 22. Thus, the cylinder bore and/or the plunger 28 is damaged and the piston 22 is also damaged.

Therefore there is a problem that in order to prevent the above described damages, inspection and replacement of component parts must be made at a relatively short frequency.

SUMMARY OF THE INVENTION

The present invention was made to overcome the above and other problems encountered in any conventional device for forcing a piston ring radially outwardly into intimate contact with the bore wall of a cylinder.

One of the objects of the present invention is therefore to provide a device for forcing a piston ring radially outwardly which is prevented from being damaged in an earlier stage of use so that its stable operation for a longer period of time can be ensured and which consists of a minimum number of component parts so that the fabrication and assembly thereof are much facilitated.

Another object of the present invention is to provide a device for forcing a piston ring radially outwardly in which even when the piston ring is damaged, a plunger can be prevented from being forced to move out of a piston ring groove and to be made into direct contact with the bore wall of a cylinder so that not only piston but also other component parts are prevented from being damaged.

In order to attain the above and other objects, the present invention provides a device for forcing a piston ring radially outwardly wherein a coiled spring and a rod of a plunger are disposed in a radial hole of a piston so that the plunger is forced to make intimate contact with a bore wall of a cylinder under reaction force of the coiled spring, comprising the coiled spring having one end greater in diameter than the radial hole for engagement with an edge surface of the radial hole, the other end of the coiled spring being smaller in diameter than the plunger rod for contact with or attached to the plunger rod, and the plunger rod extending through the coiled spring which is disposed in uncompressed state within the radial hole.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
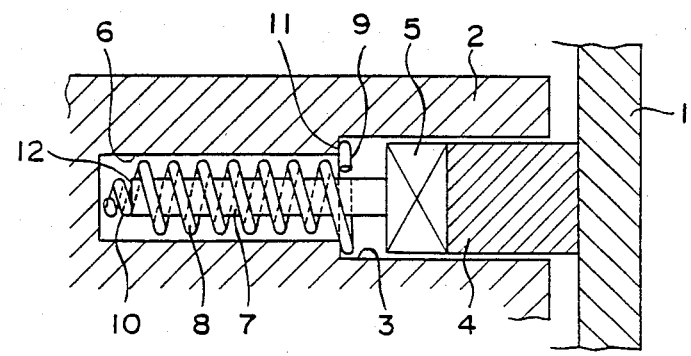
FIG. 1 is a sectional view of a first embodiment of the present invention.

Referring first to FIG. 1 illustrating a first embodiment of the present invention, reference numeral 1 designates a cylinder; 2, a piston; 3, a circumferential groove of the piston 2; 4, a piston ring loosely fitted into the groove 3; 5, a plunger; 6, a radial hole of the piston 2; 7, a plunger rod with the plunger 5 securely fixed at the outer end thereof and loosely fitted into the hole 6; 8, a coiled spring which is loosely fitted into the hole 6 and through which the plunger rod 7 extends; 9, one end of the coiled spring 8; 10, the other end of the coiled spring 8; 11, an edge surface of the hole 6, that is, a bottom surface of the groove 3; and 12, an inner end of the plunger rod 7.

The one end of the coiled spring 8 is made greater in diameter than the hole 6 of the piston 2 and is made into engagement with the edge surface 11 of the hole 6 and the other end 10 of the coiled spring 8 is made smaller in diameter than the plunger rod 7 and is made into contact with the inner edge 12 of the plunger rod 7. The plunger rod 7 extends through the coiled spring 8 which is disposed in uncompressed state within the hole 6 of the piston 2.

In the device described above with reference to FIG. 1, the one end 9 of the coiled spring 8 is made into engagement with the edge surface 11 of the hole 6 and is extended by the plunger rod 7 so that the plunger rod 7 is pushed in the radially inward direction (left in FIG. 1). Therefore the coiled spring 8 now behaves as a tension spring and the reaction force of the coiled spring 8 acts right in FIG. 1. That is, due to the reaction force of the coiled spring 8, the plunger rod 7 and the plunger 5 are forced to move right in FIG. 1 so that the piston ring 4 is forced in the right direction and is always made into intimate contact with the bore wall of the cylinder 1.

Figure 3:
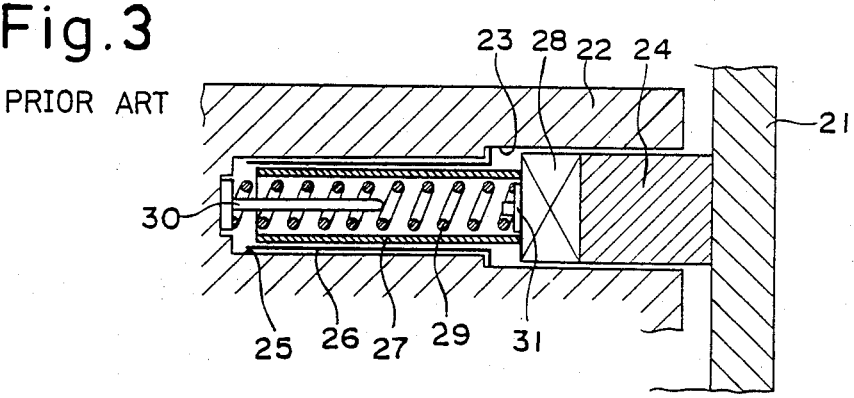
FIG. 3 is a sectional view of a conventional device for forcing a piston ring radially outwardly.

Therefore, even when the piston ring 4 is new and the deflection (elongation) of the coiled spring 8 is great, the coiled spring 8 extends straightly so that the bending of the coiled spring 8 can be prevented unlike the case of the compressed, coiled spring 29 described above with reference to FIG. 3. As a result, the coiled spring 8 is prevented from being buckled or damaged. In addition, it is not needed to finish the bottom of the hole 6 with a high degree of accuracy and the step for boring the plunger rod 7 can be eliminated. Furthermore, the sleeve 26, the guide pin 30 and the spring shoes or cushions 31 described above with reference to FIG. 3 can be entirely eliminated.

Figure 2:
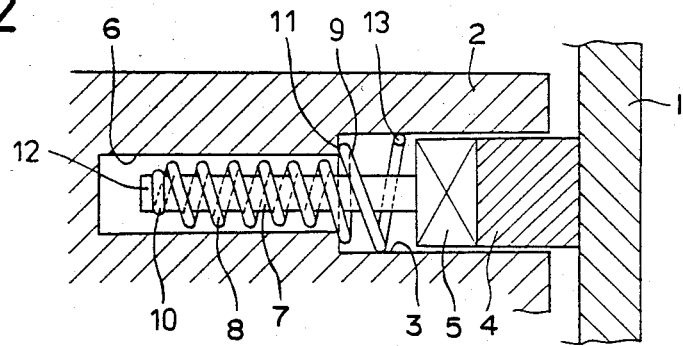
FIG. 2 is a sectional view of a second embodiment of the present invention.

Referring next to FIG. 2, a second embodiment of the present invention will be described. One end 13 of the coiled spring 8 further extends beyond the one end 9 of the coiled spring 8 in the FIG. 1 embodiment, is enlarged in diameter and is made into engagement with the side wall of the groove 3 of the piston 2. The other end 10 of the coiled spring 8 is securely caulked or attached to the inner end 12 of the plunger rod 7.

The second embodiment is advantageous over the first embodiment in that the plunger 5 is prevented from being pulled out of the groove 3 of the piston 2. That is, as described above, the one end 13 of the coiled spring 8 is pressed against the side wall of the groove 3 and a coil 9 of the coiled spring 8 which is closer to the one end 13 thereof is made into engagement with the edge surface 11 of the hole 6 while the other end 10 is securely attached to the inner end 12 of the plunger rod 7. Furthermore under the condition that the coiled spring 8 is extended or elongated by the plunger rod 7, the plunger rod 7 is pushed left in FIG. 2. Therefore the zone of the coiled spring 8 between the coil 9 and the other end 10 thereof behaves like a tension spring so that the reaction force thereof acts right in FIG. 2. As a result, the plunger rod 7 and the plunger 5 are forced right in FIG. 2 by the reaction force of the coiled spring 8 so that the piston ring 4 is forced to move radially outwardly (right in FIG. 2) and is forcibly made into intimate contact with the bore wall of the cylinder 1.

Therefore, even when the piston ring 4 is broken, the only result is that the coiled spring 8 loses its deflection (elongation); since the one end 13 of the coiled spring 8 is forced to engage with the side wall of the groove 3, the plunger 5 is prevented from being pulled out of the groove 3 of the piston 2. Furthermore, the plunger rod 7 whose inner end 12 is in engagement with the other end 10 of the coiled spring 8 is prevented from moving out of the hole 6 of the piston and consequently the plunger 5 which is securely attached to the outer end of the plunger rod 7 is prevented from moving out of the groove 3. Therefore, the damages of the component parts as described above with reference to FIG. 3 can be prevented.

As described above, in the conventional device, the coiled spring behaves as a compression spring so that the newer the piston ring which is not worn, the more frequently the coiled spring is damaged; therefore, there is a danger that the coiled spring is damaged in an early stage of use. On the other hand, according to the present invention, in order that the coiled spring may behave as a tension spring, one end of the coiled spring is made greater in diameter than the radial hole of the piston and is made into engagement with the edge surface of the hole of the piston while the other end of the coiled spring is made smaller in diameter than the plunger rod and is made into engagement with the inner end of the plunger rod. Furthermore, the plunger rod is extended through the coiled spring which is extended or elongated and disposed in the radial hole of the piston. Therefore the coiled spring is prevented from being damaged in a earlier stage of its use so that the device of the present invention can be used in a stable manner for a long period of time. Moreover, the number of component parts can be reduced so that fabrication and assembly thereof are much facilitated. In addition, even when the piston ring is damaged, the coiled spring and the plunger are prevented from being pulled out of the piston ring groove so that not only the piston and the cylinder but also the other component parts are prevented from being damaged. As a result, the inspection of the cylinder and the piston and the replacement of the component parts in an early stage of use are not needed so that the running cost can be considerably reduced. Furthermore, the present invention can be advantageously applied to the existing cylinders, pistons and piston rings without the need of any modification thereof in size and shape. Moreover, according to the present invention, the coiled spring is prevented from slipping out of the piston ring groove so that the number of components is not increased at all.

What is claimed is:

1. A device for forcing a piston ring radially outwardly wherein a piston ring is accomodated in a circumferential groove at an outer cylindrical surface of a piston and a coiled spring and a plunger rod are inserted into a radial hole formed on said piston, whereby reaction force of said coiled spring causes a plunger to force the piston ring against a bore wall of a cylinder, comprising the coiled spring having one end greater in diameter than said radial hole for engagement with an edge surface of said hole while the other end of said coiled spring is smaller in diameter than said plunger rod and is engaged with a free end of said plunger rod, and the plunger rod extending in uncompressed state through said coiled spring into said radial hole.

2. A device according to claim 1 wherein the one end of said coiled spring is extended beyond said edge surface of said radial hole, enlarged in diameter and is made into engagement with a side wall of said groove.

3. A device according to claim 1 wherein the engagement of the other end of said coiled spring with the free end of the plunger rod is in the form o contact.

4. A device according to claim 1 wherein the engagement of the other end of said coiled spring with the free end of the plunger rod is in the form of secure attachment.

* * * * *